United States Patent
Leblang et al.

(10) Patent No.: US 7,246,308 B1
(45) Date of Patent: Jul. 17, 2007

(54) AUTOMATICALLY IDENTIFYING LINKS DISPLAYED BY A BROWSER THAT IS BEING USED BY A USER THAT POINT TO PAGES OF WEB SITES SELECTED AS BEING OF INTEREST TO THE USER

(75) Inventors: Jonathan Leblang, Menlo Park, CA (US); Udi Manber, Palo Alto, CA (US)

(73) Assignee: A9.com, Inc., Palo Alto, CA (US)

( * ) Notice: Subject to any disclaimer, the term of this patent is extended or adjusted under 35 U.S.C. 154(b) by 386 days.

(21) Appl. No.: 10/788,885

(22) Filed: Feb. 27, 2004

(51) Int. Cl.
*G06N 3/00* (2006.01)
(52) U.S. Cl. .................................. 715/501.1; 715/513
(58) Field of Classification Search ............ 715/501.1, 715/500, 513; 705/26
See application file for complete search history.

(56) References Cited

U.S. PATENT DOCUMENTS

| | | | | |
|---|---|---|---|---|
| 6,864,904 B1* | 3/2005 | Ran et al. | | 715/760 |
| 7,047,502 B2* | 5/2006 | Petropoulos et al. | | 715/781 |
| 7,073,121 B2* | 7/2006 | Brown et al. | | 715/513 |
| 2002/0154167 A1* | 10/2002 | Parsons et al. | | 345/764 |
| 2002/0184095 A1* | 12/2002 | Scullard et al. | | 705/14 |
| 2004/0078451 A1* | 4/2004 | Dietz et al. | | 709/217 |
| 2004/0205499 A1* | 10/2004 | Gupta | | 715/501.1 |
| 2004/0205501 A1* | 10/2004 | Gupta | | 715/501.1 |

OTHER PUBLICATIONS

Danny Sullivan, Search Toolbars & Utilities, Jan. 27, 2004, SearchEngineWatch, pp. 1-8.*

* cited by examiner

*Primary Examiner*—Stephen Hong
*Assistant Examiner*—Manglesh Patel
(74) *Attorney, Agent, or Firm*—Christensen O'Connor Johnson Kindness PLLC (57) ABSTRACT

A facility for analyzing a web page is described. The facility receives the web page. For each link occurring in the web page, if the link points to a web site previously indicated by a user as being of interest, the facility modifies the web page to identify the link as pointing to a web site of interest.

15 Claims, 13 Drawing Sheets

AUTOMATICALLY IDENTIFYING LINKS DISPLAYED BY A BROWSER THAT IS BEING USED BY A USER THAT POINT TO PAGES OF WEB SITES SELECTED AS BEING OF INTEREST TO THE USER

TECHNICAL FIELD

The present invention is directed to the field of electronic document navigation, such as web navigation.

BACKGROUND

As the body of information available via the World Wide Web ("the web") expands, typical computer users spend more time exploring and retrieving information available on the web. Information is typically accessed by visiting a web site, which is a group of web pages accessed via a common top level domain name. As part of this process, users form opinions of a large number of web sites. For example, a user visiting a merchant's web site might decide that the merchant offers a particularly generous return policy. As another example, a user visiting a health information web site might determine that the health information web site provides easily-understood articles on a variety of health issues. Because of the high rate at which users encounter web sites of interest, it is generally very difficult for users to remember these web sites and the URLs used to access them without some form of assistance.

To assist a user in remembering web sites of interest to the user, typical web browsers provide limited functionality to enable a user to capture information about the web sites that the user visited. Some browsers enable a user to create "bookmarks" for web sites that enable the user to quickly return to those web sites. Because creating and categorizing a usable bookmark typically requires a user to complete a number of steps, however, most users only create bookmarks for a small number of web sites that they have visited. Web sites that are typically bookmarked include those that the user visits repeatedly, often a small subset of the sites that may be of interest to a user. Other browsers maintain a history of all web pages or all web sites visited by a user. Because such a history lists all web pages or web sites the user visited, though, it does not enable the user to differentiate visited web sites that were of interest from visited web sites that were not of interest.

A general shortcoming of both bookmarks and history lists is that a user must remember that the user previously bookmarked or viewed a site, and must access the bookmark or history file in order to find the site again. Neither functionality operates in a manner in which the browser provides information to inform the user that they have previously viewed a particular site and found the particular site to be of interest. As a result, a user browsing the web who encounters a web site or a link to a web site that the user earlier visited and determined to be of interest would be unlikely to associate the link with the user's earlier interest in the web site. In this way, the user can lose valuable information that might have otherwise encouraged them to follow the link.

For the reasons outlined above, a system that assisted users in capturing and taking advantage of information about web sites of interest would have significant utility.

DETAILED DESCRIPTION

Overview

A software facility ("the facility") is described that (1) enables a user to straightforwardly select web sites that are of interest, and (2) automatically identifies to the user the links to web sites that were previously selected as being of interest. In some embodiments, the facility displays a control such as a button in conjunction with a browser used by the user. When the user determines that a web site currently being visited in the browser is of interest, the user activates the displayed control to indicate interest in the web site. In response, the facility adds the web site to a list of web sites that are of interest to the user (the "interest list"). Once an interest list has been created, the facility may use the interest list to highlight sites on the list in a variety of contexts, including during the user's normal search and browsing activities. On some or all of the web pages visited with the browser, the facility identifies hyperlinks contained in the web page that point to web sites that are on the interest list. A variety of approaches may be used to highlight the links to web sites that are on the interest list. As some examples, the facility may highlight such links in a contrasting color, display one or more icons near such links, display boxes around such links, promote entries in a search result containing such links to the top of the search result, output sounds that draw attention to such links, etc. In some embodiments, the facility identifies a web site that is on the interest list when a page of the web site is being displayed in the browser, such as by highlighting the displayed control when the web page is displayed, or by displaying the special offer within the displayed web page.

A representative application where it is particularly valuable to identify sites of previous interest to a user is the presentation to the user of search results from a search engine. When a users search results include one or more sites that are on the user's interest list, the facility identifies those links and highlights the hyperlinks to the site or sites for the benefit of the user.

In some embodiments, the facility manages multiple interest lists, each associated with a user's role, browsing mode, or subject matter. In some situations, the facility may restrict link identification to those links that point to sites in a single list that is selected as the current list. In other situations, the facility may identify links that point to sites in different interest lists in different ways, for example by displaying different icons near them, highlighting them in different colors, etc.

In some embodiments, the facility identifies links that point to sites of interest on the client computer system on which the browser is executing. In some embodiments, the facility identifies links that point to sites of interest on a computer system other than the client computer system, such as a web server computer system serving the web page currently being displayed by the browser, or a proxy server computer system through which the web page is delivered to the client computer system.

In some embodiments, the facility uses a user's interest list to target promotions to the user from web sites on that list. Advertisements or other offers to the user may be surfaced next to links that are highlighted as being of interest to the user. Operators of the web sites that are associated with the promotions may be charged to display the promotions, or may be charged when a user clicks through to the web site associated with the promotion. In some cases, an advertiser may present a special offer only to users who have shown an interest in a web site, such as the advertiser's web site. By enabling such selective promotions, the facility tends to encourage users to mark web sites, as well as encouraging advertisers to offer such promotions.

By identifying links in some or all of the ways described above, the facility helps a user take advantage of his or her earlier browsing experience to select links that point to web sites that are of interest to the user. For example, if a web page contains links to a number of different merchants that all sell a particular item that the user wishes to buy, the facility assists the user to follow the link to a merchant that the user earlier decided offers a particularly generous return policy, or the link to a merchant that the user earlier decided provides good customer service and is trustworthy overall. As another example, if a web page containing a newspaper article about an important new health issue contains links to articles on several different web sites discussing this health issue in more detail, the facility assists the user to follow the link to the article that is on a web site that the user earlier determined to provide easily-understood articles on health issues.

Detail

Figure 1:
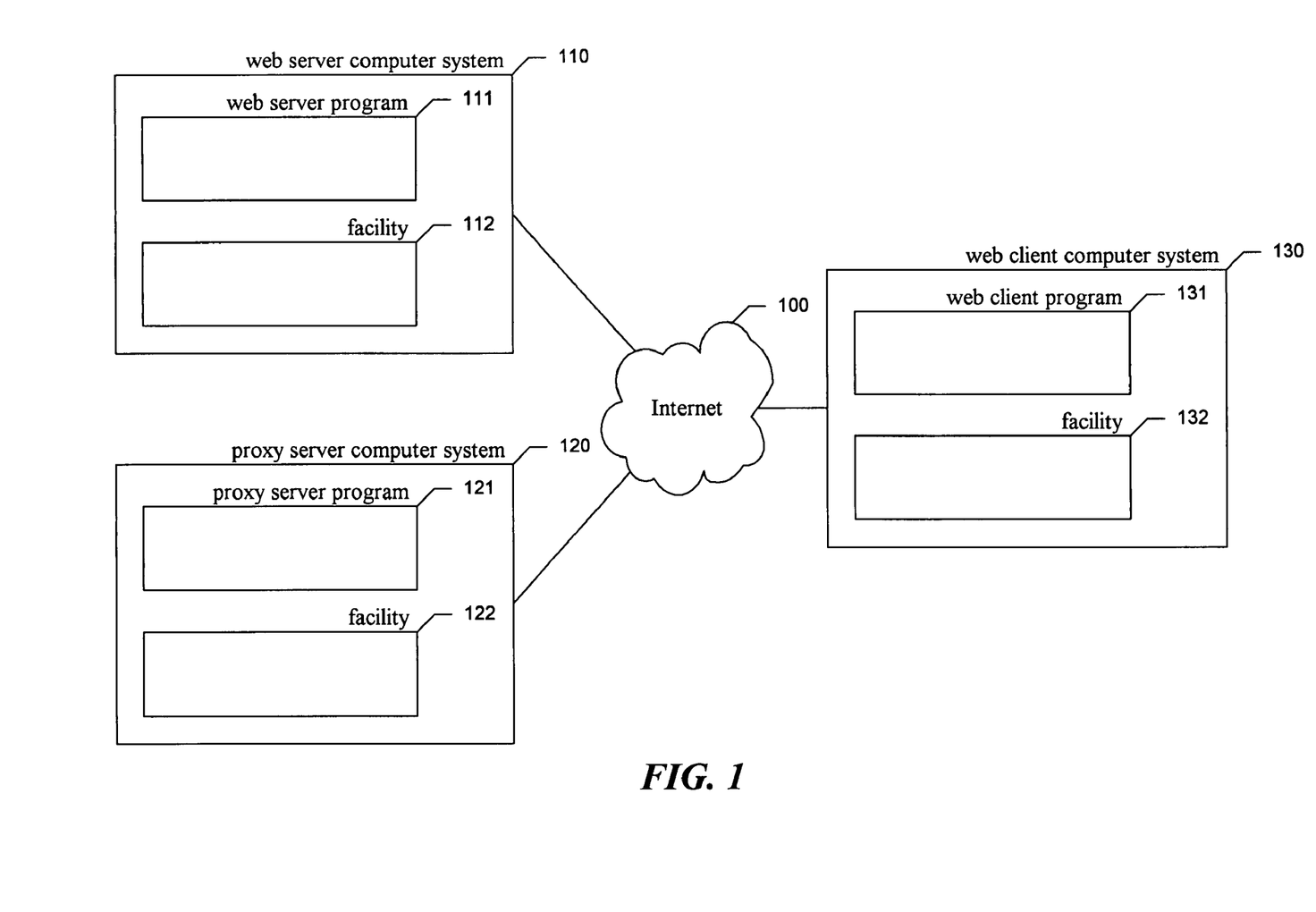
FIG. 1 is a network plot diagram showing a typical environment in which the facility operates.

FIG. 1 is a network plot diagram showing a typical environment in which the facility operates. FIG. 1 shows a number of network nodes connected by the Internet 100 or another network: a web server computer system 110, a proxy server computer system 120, and a web client computer system 130. To browse the web, a user of the web client computer system interacts with the web client program 131 to retrieve and display a web page. The web client program sends a request for the web page to a web server program 111 executing on the web server computer system, either directly, or via a proxy server program 121 executing on the proxy server computer system. In response to this request, the web server program returns the requested web page to the web client program, either directly or via the proxy server program. In some embodiments, a component 132 of the facility is installed on the web client computer system that (a) enables the user to add web sites to a list of web sites that are of interest to the user (the "interest list"), and/or (b) automatically highlights links occurring on retrieved and displayed web pages that point to web sites on the interest list. In some embodiments, some or all of these functions are performed by a component 122 of the facility installed on the proxy server computer system or a component 112 of the facility installed on the web server computer system.

While various functionalities and data are shown in FIG. 1 as residing on particular computer systems that are arranged in a particular way, those skilled in the art will appreciate that such functionalities and data may be distributed in various other ways across one or more computer systems or other computing devices in different arrangements.

Figure 2:
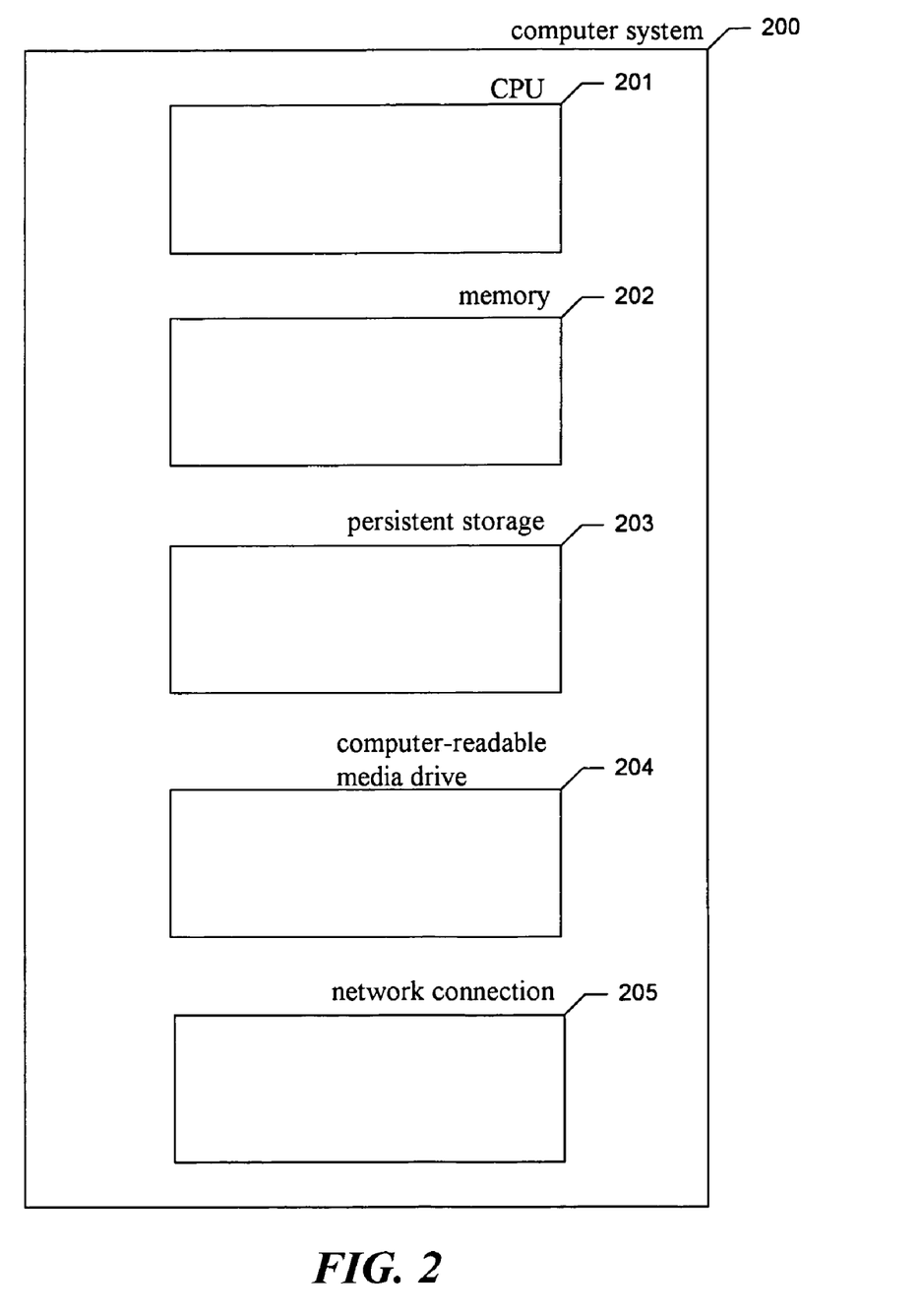
FIG. 2 is a block diagram showing some of the components typically incorporated in at least some of the computer systems and other devices on which the facility executes.

FIG. 2 is a block diagram showing some of the components typically incorporated in at least some of the computer systems and other devices on which the facility executes. These computer systems and devices 200 may include one or more central processing units ("CPUs") 201 for executing computer programs; a computer memory 202 for storing programs and data—including data structures—while they are being used; a persistent storage device 203, such as a hard drive, for persistently storing programs and data; a computer-readable media drive 204, such as a CD-ROM drive, for reading programs and data stored on a computer-readable medium; and a network connection 205 for connecting the computer system to other computer systems, such as via the Internet, to exchange programs and/or data-including data structures. While computer systems configured as described above are typically used to support the operation of the facility, one of ordinary skill in the art will appreciate that the facility may be implemented using devices of various types and configurations, and having various components.

Figure 3:
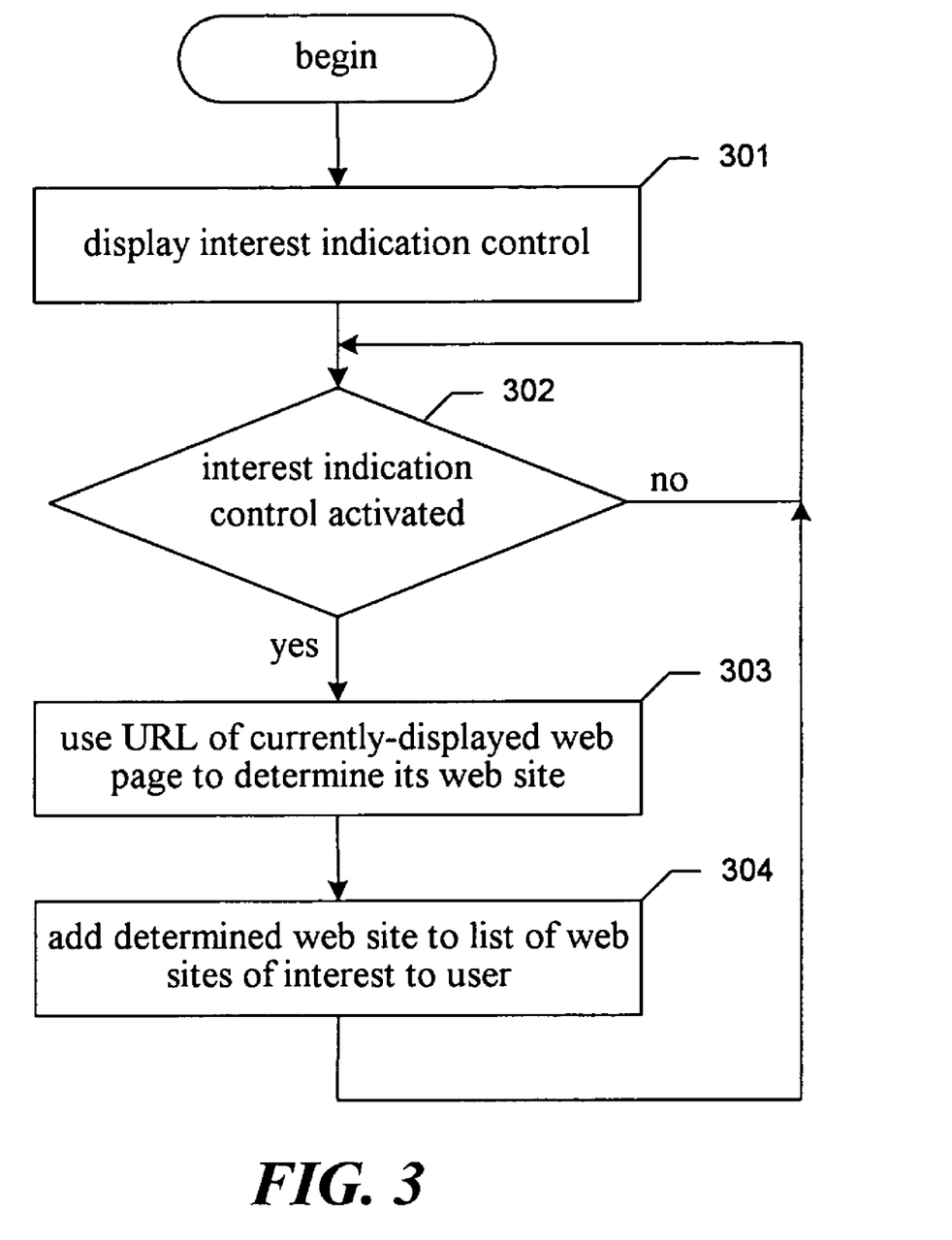
FIG. 3 is a flow diagram showing steps typically performed by the facility in order to enable the user to select web sites of interest.

FIG. 3 is a flow diagram showing steps typically performed by the facility in order to enable the user to select web sites of interest and have the web sites of interest added to the interest list. In step 301, the facility displays a control that the user may activate in order to indicate interest in the web page that is currently being displayed in the browser. The control may be a button, or a control of another type. In some embodiments, the control is integrated into other controls displayed by the browser, such as native controls or third-party toolbars. As is described in greater detail by Programming and Reusing the Browser, available at http://msdn.microsoft.com/library/default.asp?url=/workshop/browser/progr_browser_node_entry.asp, which is hereby incorporated by reference in its entirety, such a third-party toolbar or "browser bar," can be incorporated in the Internet Explorer browser from Microsoft Corporation by developing a COM component that implements the lobjectWith-SiteImpl, linputObject, and ldeskBand interfaces, and registering the component with the operating system as a browser bar. In some embodiments, the controls are displayed within the context of the web page that is currently being displayed in the browser, such as a link or other control added to the web page, such as by the web server that generated the web page, or a web proxy that has processed the web page. In some embodiments, the control is displayed outside the browser window, such as in a separate window, on the desktop, or in the desktop task bar. In some embodiments, the facility does not display a visible control in step 301, but permits the user to indicate interest in the web page that is currently being displayed in the browser using other forms of computer input, such as by typing a keystroke or keystroke combination, or by speaking a voice command.

In step 302, if the control displayed in step 301 is activated, then the facility continues in step 303, else the facility continues in step 302. In step 303, the facility uses the URL of the currently-displayed web page to determine the web site to which this web page belongs. In some embodiments, step 303 involves extracting the domain from the web page's URL. In other embodiments, step 303 involves performing various other processing on the URL.

In step 304, the facility adds the web site determined in step 303 to a list of web sites that are of interest to the user (the "interest list"). Step 304 typically involves storing information representing the web site, such as a string containing a domain or other URL prefix for the web site. The facility may also store additional information, such as the date and time on which the web site was added to the list, a characterization of the web site, such as text entered by the user describing the web site or selections made by the user with respect to the web site (e.g., whether the web site is "excellent", "good" or "average"), etc. After step 304, the facility continues in step 302 to await the next activation of the interest indication control.

Figure 4:
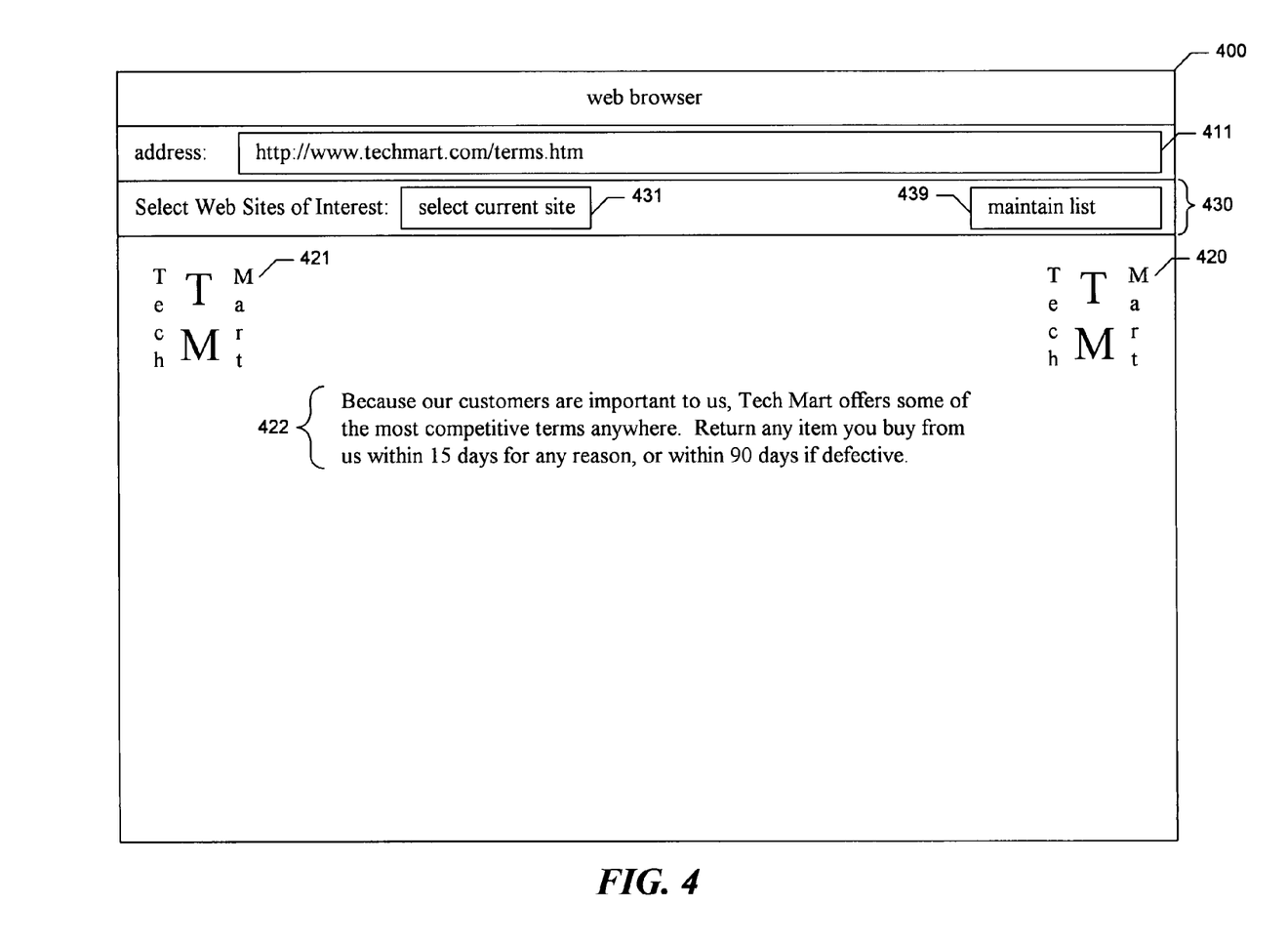
FIG. 4 is a display diagram showing a typical display generated by the facility to enable the user to select a web site of interest.

FIG. 4 is a display diagram showing a typical display generated by the facility to enable the user to select a web site of interest. The display includes a web browser window 400. The window includes an address field 411, into which the user may enter the URL for a web page in order to retrieve and display that web page. As is well-known to those of skill in the art, the user may also use a variety of other techniques in order to navigate to the displayed web page. The window includes a page display area 420. It can be seen that the page display area 420 contains the contents of the web page whose address has been entered in the address field. This web page includes an icon 421 associated with the web site to which the web page belongs, as well as additional content 422. The window further includes a toolbar 430 containing controls relating to the facility, including a site selection control 431 that the user may activate in order to indicate that the web site to which the currently-displayed web page belongs is of interest to the user. In order to add the web site to which this web page belongs to the interest list, the user activates control 431 while the web page is displayed in page display region 420. The toolbar further includes a control 439 that the user may activate to link to a web page or other application that allows the user to maintain the list of web sites that are of interest. After the user activates control 439, the facility typically displays the list of selected web sites, and enables the user to delete web sites from this list, add web sites to this list, or otherwise modify this list as shown below in FIG. 5.

Figure 5:
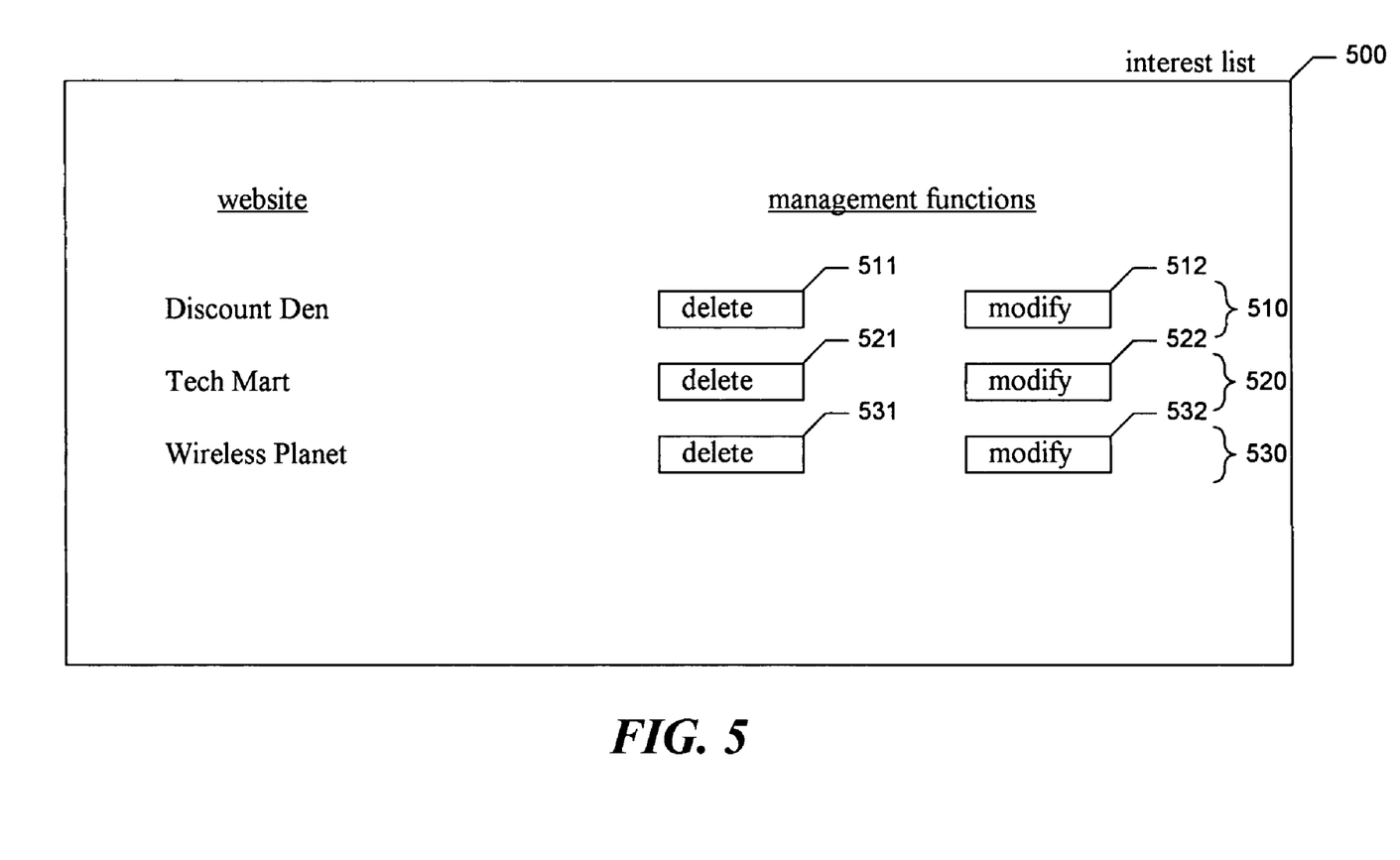
FIG. 5 is a display diagram showing a typical display generated by the facility to enable the user to maintain the user's interest list.

FIG. 5 is a display diagram showing a typical display generated by the facility to enable the user to maintain the user's interest list. FIG. 5 shows an interest list 500, listing a number of web sites 510, 520, and 530 that the user has added to the user's interest list. Each web site is accompanied by a delete control, such as delete control 511, that the user may activate in order to delete the web site from the interest list. Each web site is further accompanied by a modify control, such as modify control 512, that the user can activate in order to modify the web site's listing in the interest list, such as by changing a user characterization of the web site, or by transferring the web site to a role, browsing mode, or interest specified by the user. Those skilled in the art will appreciate that a variety of user interfaces having different appearances may provide the same or similar functionality. In addition to activating selection control 431, it will be appreciated that a variety of other ways may be used to allow the user to add web sites to the interest list, including transferring web sites from a list of bookmarks or from a browser history identifying the web pages that the user has recently visited.

Figure 6:
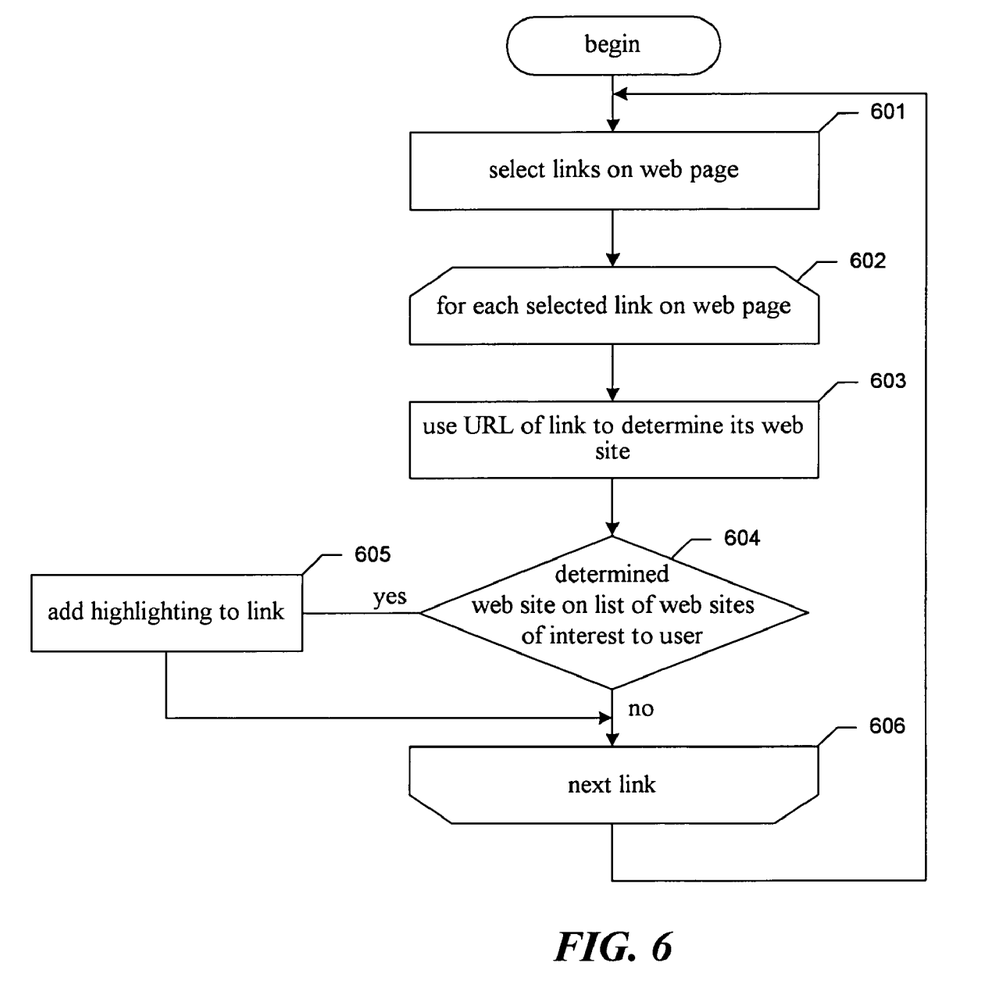
FIG. 6 is a flow diagram showing steps typically performed by the facility in order to highlight links in a web page that point to web sites selected by the user as being of interest.

Once a user has added a number of sites to the interest list, the interest list may be used by the facility in a variety of ways. FIG. 6 is a flow diagram showing steps typically performed by the facility in order to highlight links in a web page that point to web sites that are contained in the user's interest list. These steps may be performed in the web server that generates the web page, in a proxy server that processes the web page, or in the web client or browser of the user. In step 601, the facility identifies some or all of the links occurring on the web page. While in some embodiments the facility identifies a proper subset of the links occurring on the web page, the facility more typically identifies all of the links occurring on the web page. In steps 602-606, the facility loops through each link identified in step 601. In step 603, the facility uses the URL of the link being analyzed to determine the web site that corresponds to the URL (such as by parsing the URL to identify the web site corresponding to the web page represented by the URL). In step 604, if the web site determined in step 603 is on the interest list, then the facility continues in step 605, else the facility continues in step 606. In step 605, the facility adds highlighting to the link in the web page. Such highlighting may take a wide variety of forms, some of which are illustrated in FIGS. 7-10 and 13-14, discussed below. After step 605, the facility continues in step 606. In step 606, if additional identified links remain to be processed, the facility loops back to step 602 to process the next link. After step 606, the facility continues in step 601 to process the next web page.

As one example, the steps shown in FIG. 6 may be implemented using a browser extension. As is further discussed by Web Accessories, available at http://msdn.microsoft.com/workshop/browser/accessory/overview/overview.asp, which is hereby incorporated by reference in its entirety, such a browser extension recognizes when the browser has completed navigating to, retrieving, and rendering a new document; parses the resulting document object models to identify links; and modifies the document object model to highlight links.

Figure 7:
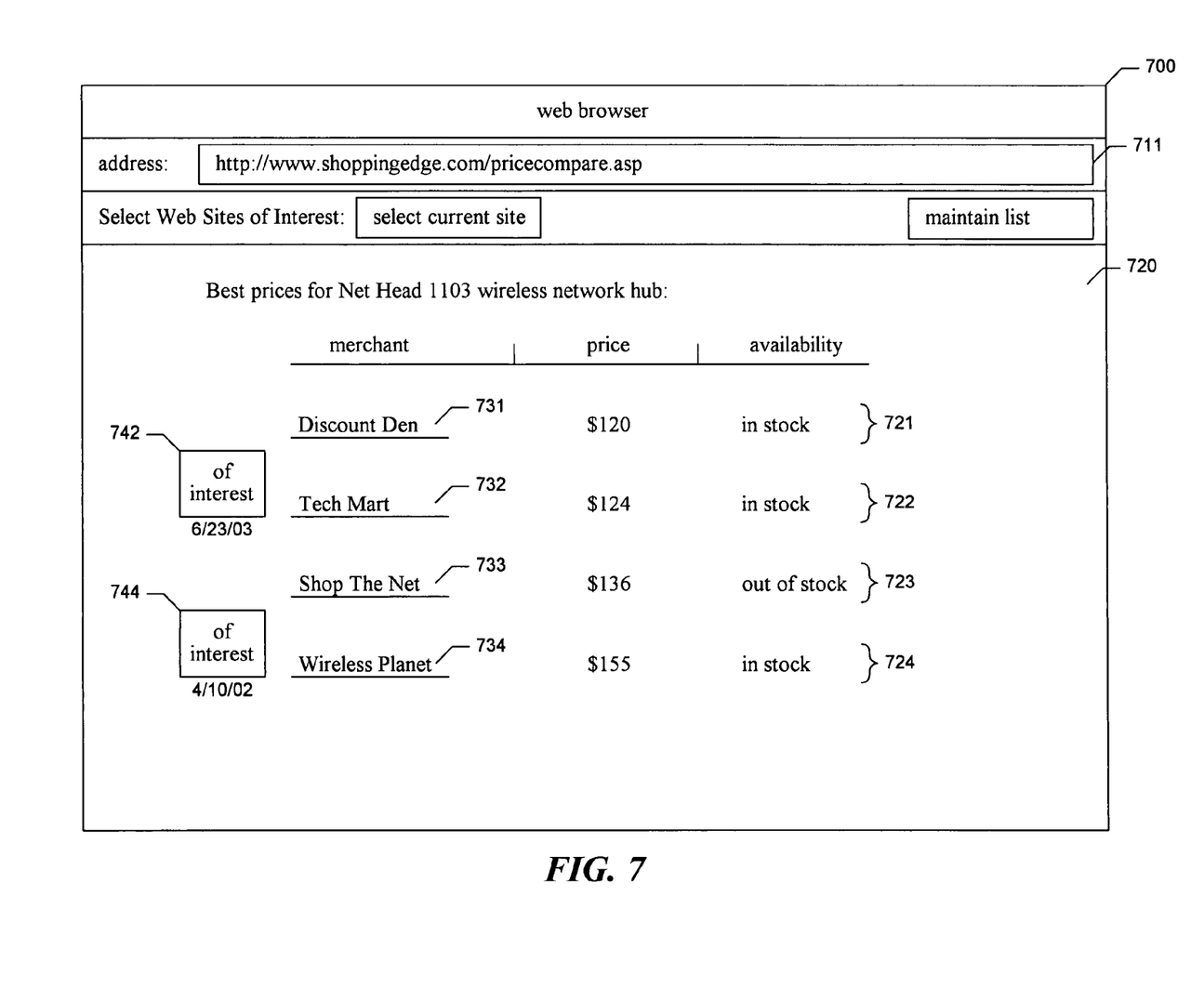
FIG. 7 is a display diagram showing a typical web page in which the facility has highlighted links in a web page that point to web sites selected by the user as being of interest.

FIGS. 7-10 show different exemplary approaches used by the facility to highlight links that point to web pages contained in the interest list. FIG. 7 is a display diagram showing a typical web page in which the facility has highlighted links that correspond to sites on the user's interest list. FIG. 7 shows a web browser window 700 in which a web page 720 is displayed, the web page corresponding to a URL shown in the address field 711. In this particular example, the web page contains a sample search result generated by a shopping bot. The search result identifies web merchants that carry a "NetHead 1103 wireless network hub" product. Each of items 721-724 in the search result corresponds to a different one of these merchants.

Each search result item 721-724 contains the name of the merchant, the price at which the merchant offers the product, and the merchant's current level of availability for the product. In each case, the merchant's name is also a link 731-734 to a web page in the merchant's web site, such as a product detail page that the user may use to order the product from the merchant. By analyzing the URLs in links 731-734 in accordance with the steps shown in FIG. 6, the facility has determined that links 732 and 734 point to web sites that are of interest to the user. Accordingly, the facility has highlighted these two links by displaying "of interest" visual indicators 742 and 744. These visual indicators are each displayed with an indication of the date on which the user most recently indicated the corresponding web site to be of interest. By highlighting those sites that have been previously visited and are of interest to the user, the user may decide to follow link 732 in order to purchase the product based upon the user's past interest in the corresponding web site, despite the fact that it appears to be possible to purchase the product more cheaply by following link 731 to a different web site.

Figure 8:
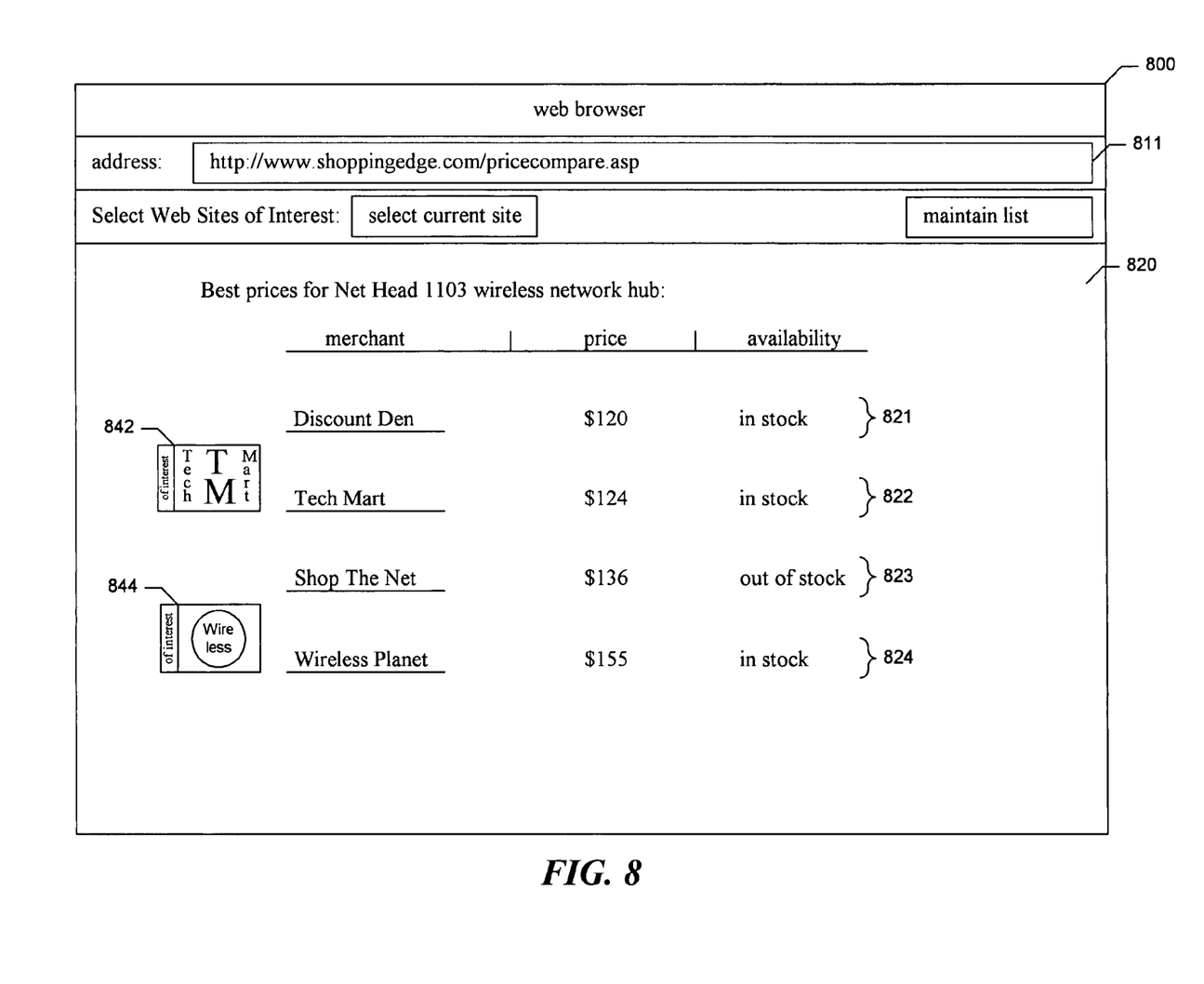
FIG. 8 is a display diagram showing a typical web page in which the facility has highlighted links that point to web pages selected by the user as being of interest in an alternate manner.

FIG. 8 is a display diagram showing a typical web page in which the facility has highlighted links that point to web pages selected by the user as being of interest in an alternate manner. FIG. 8 differs from FIG. 7 in that visual indicators of interest 842 and 844 are customized with respect to the corresponding web sites of interest. For example, it can be seen that visual indicator 842 contains icon 421, associated with the corresponding web site as shown in FIG. 4.

Figure 9:
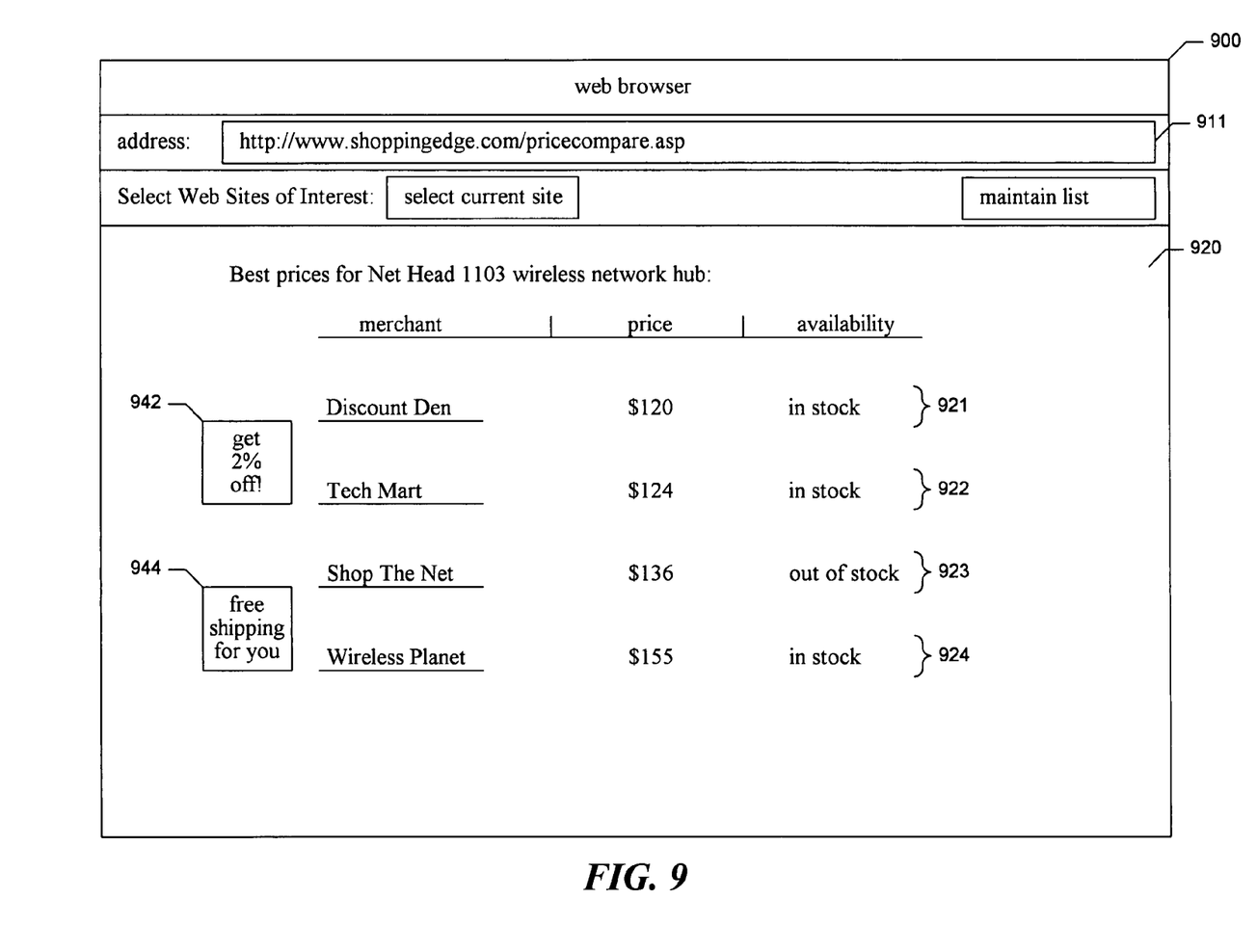
FIG. 9 is a display diagram showing a typical web page in which the facility has highlighted links that point to web sites that the user has selected as being of interest with promotions targeted to the user.

FIG. 9 is a display diagram showing a typical web page in which the facility has highlighted links that point to web sites that the user has selected as being of interest, and has included promotions targeted to the user as part of the highlighting. FIG. 9 differs from FIGS. 6, 7 and 8 in that visual indicators 942 and 944 contain promotions targeted to the user by the corresponding web sites based upon the user's selection of the web sites as being of interest. The operator of the facility may negotiate with operators of various web sites who arranged to present these promotions using the facility, and to collect revenue or other benefits in exchange for doing so. As examples, the operator of the facility may negotiate with web site operators to present these promotions in exchange for a flat price, such as a certain dollar amount per month. Alternatively, the operator of the facility may allow the web site operators to present the promotions at no cost, but to charge the web site operator a certain dollar amount every time that a user clicks on the promotion or the corresponding site link and is redirected to the web site.

Figure 10:
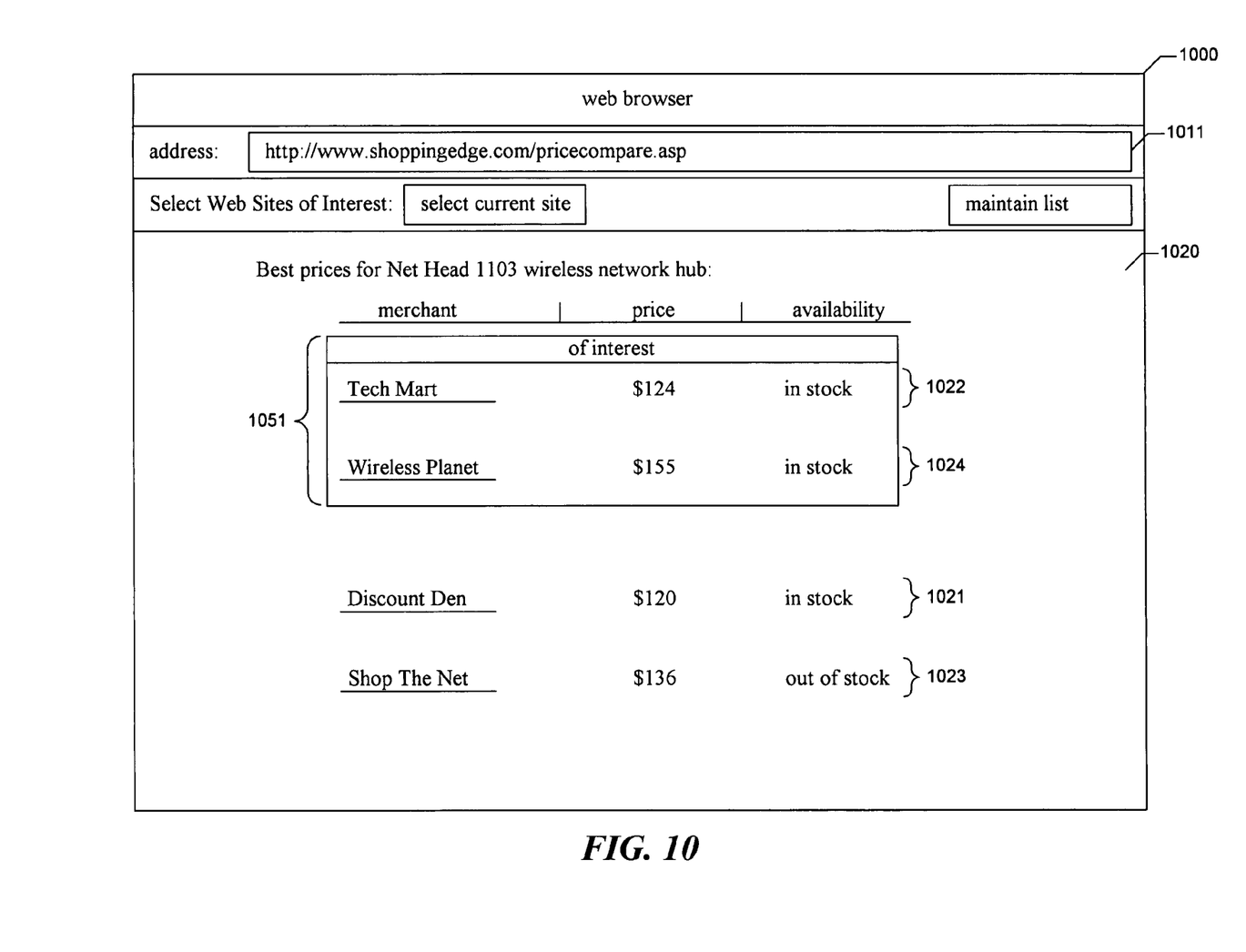
FIG. 10 is a display diagram showing a search result in which the facility has promoted to the top of the search result search result items containing links that point to web sites that the user has selected as being of interest.

FIG. 10 is a display diagram showing a search result in which the facility has promoted those items from web sites that are in the user's interest list to the top of the search result list. FIG. 10 differs from FIGS. 7-9 in that, rather than highlighting the links that point to web sites of interest to the user by displaying special images beside them, the facility has highlighted these links by promoting search result items 1022 and 1024 to a different location in the list of search result entries, and by identifying the links in a different color, e.g., in red text rather than black text. Additionally, in some embodiments, the facility differentiates the search result items from the remainder of the search result in a variety of ways, such as creating a special section 1051 of the search result to contain them.

Figure 11:
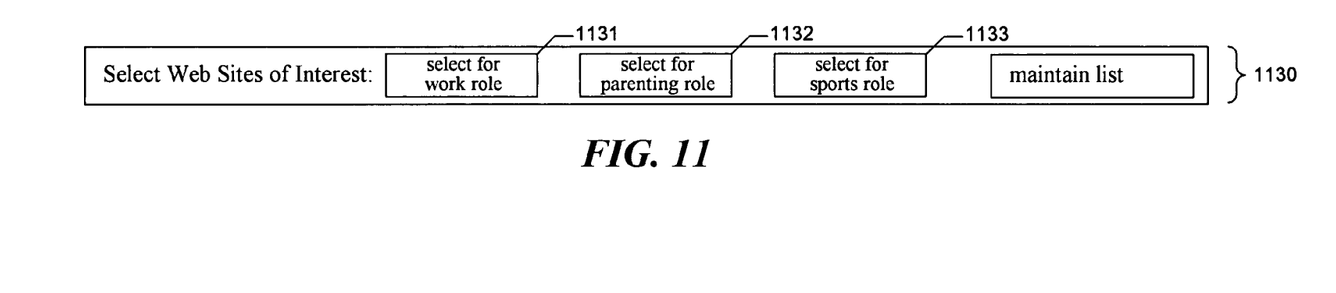
FIG. 11 is a display diagram showing a display generated by the facility in which the user may select different buttons for different roles.
Figure 12:
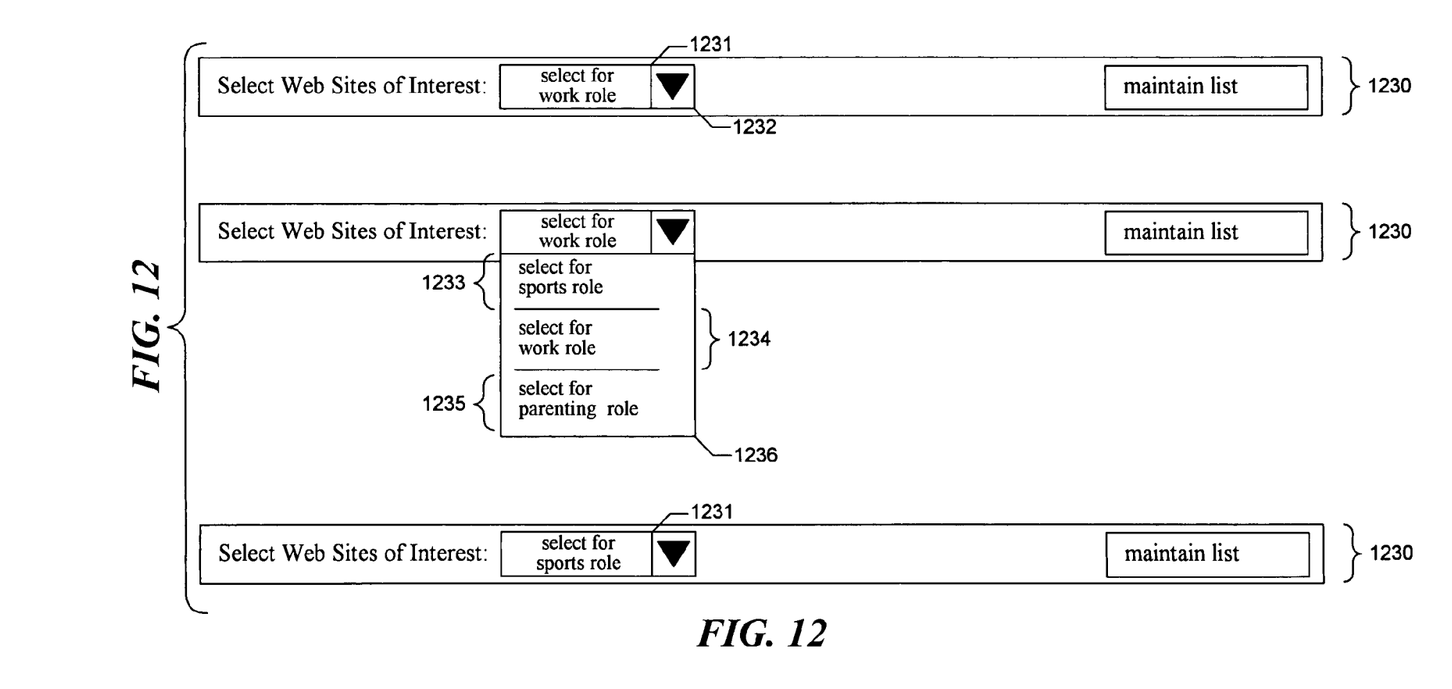
FIG. 12 is a display diagram showing a display generated by the facility in which a single button whose function may be altered by the user is presented.

FIGS. 11-12 show different exemplary approaches used by the facility to manage multiple interest lists for a single user. Each interest list may be automatically assigned by the facility, or defined by the user, to correspond to a particular role, browsing mode, or subject matter. For example, the user may have an interest list corresponding to a role such as browsing at work or browsing at home, an interest list corresponding to a browsing mode such as shopping or researching, and an interest list corresponding to various subject matter such as genealogy, photography, or wind surfing. The user may wish to associate the user's interest in a web site with particular ones of these roles, browsing modes, or subject matters. By allowing the user to define an interest list that corresponds to a role, browsing mode, or subject matter, the facility is able to more accurately specify why web site links that are highlighted by the facility are of interest to a user. Those skilled in the art will appreciate that the multiple interest lists may be managed by the facility as separate data structures, or as a single data structure with fields that allow the entries of each different interest list to be identified.

FIG. 11 is a display diagram showing a display generated by the facility in which the user may select different buttons for different interest lists. Toolbar 1130 contains three different buttons for identifying the interest list to which the currently-displayed web page belongs: a button 1131 for selecting this web site as being of interest for a work role of the user, a button 1132 for selecting this web site as being of interest for a parenting role of the user, and a button 1133 for selecting this web site as being of interest for a sports role of the user. To identify the web site to which the currently-displayed web page belongs as being of interest to the sports role, for example, the user selects button 1133.

FIG. 12 is a display diagram showing a display generated by the facility in which a single button can be used to specify which interest list the web site being viewed should be associated with. Toolbar 1230 contains configurable button 1231. In its initial state, the button 1231 may be selected by the user in order to assign the web site associated with the currently-displayed web page to the user's work role interest list. By operating the pull-down menu button 1232, the user can select which interest list is selected when button 1231 is depressed. When the user selects the pull-down menu button 1232, the facility displays a drop-down menu 1236 listing other interest lists 1233-1235 that have been established for the user. The user may select any of the interest lists in the drop-down menu in order to change the function of the configurable button to selecting web sites for that interest list. After the user selects interest list 1233 from drop-down menu 1236, the facility modifies the function and appearance of configurable button 1231'. If the user selects button 1231' at this point, the facility assigns the web site associated with the currently-displayed web page to the user's sports role interest list. Interest lists that are included in the drop-down menu 1236 may be defined by a user via a separate user interface (not shown).

Figure 13:
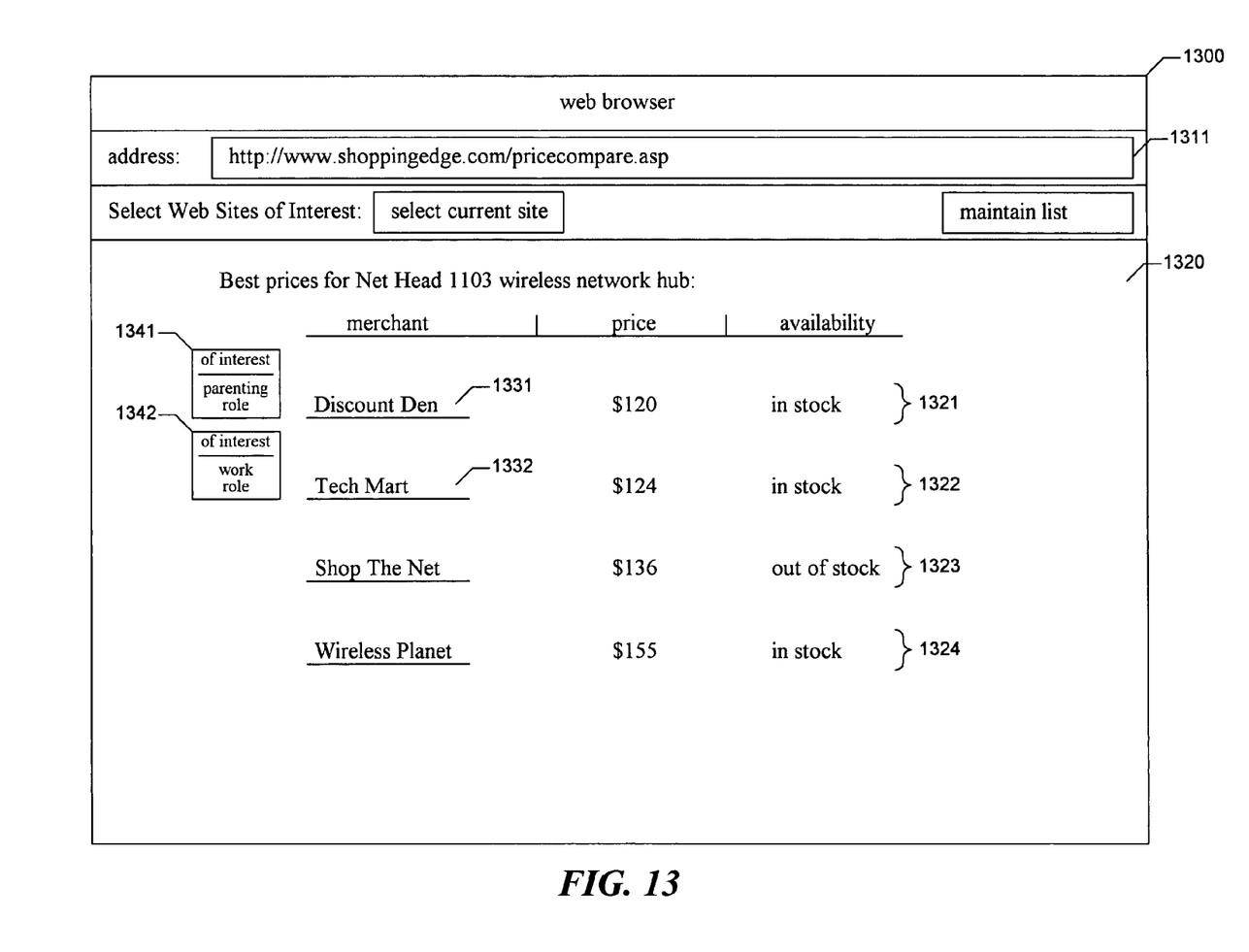
FIG. 13 is a display diagram showing a web page in which the facility has highlighted two different links as being of interest to different roles of the user.
Figure 14:
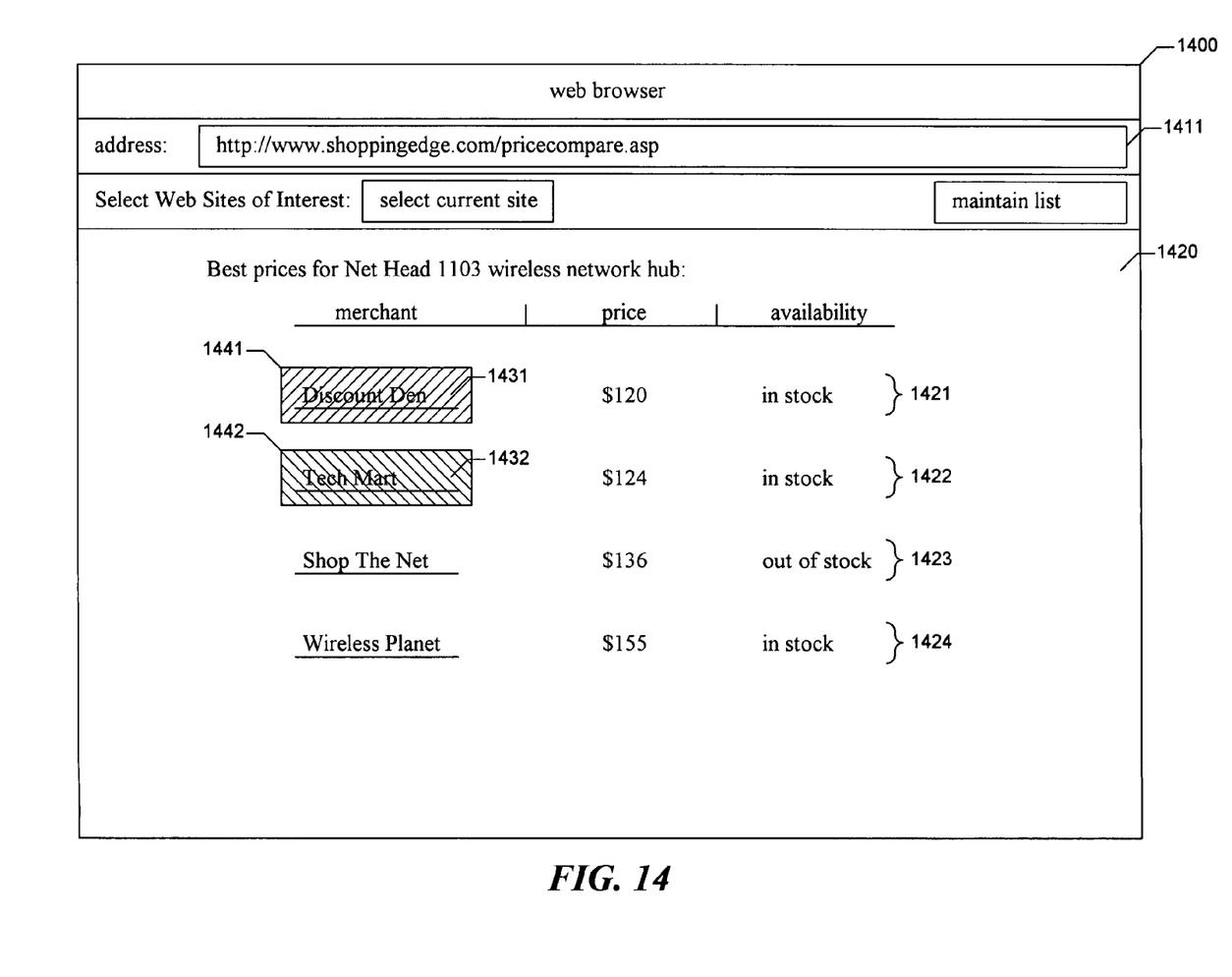
FIG. 14 is a display diagram showing a web page in which the facility has highlighted in another manner two different links as being of interest to different roles of the user.

FIGS. 13-14 show different exemplary approaches used by the facility to highlight links that are contained in different interest lists. FIG. 13 is a display diagram showing a web page in which the facility has highlighted two different links as being of interest to different roles of the user. It can be seen that the facility has highlighted link 1331 as pointing to a web site that is of interest to the user's parenting role by displaying visual indicator 1341, and highlighted link 1332 as pointing to a web site that is of interest to the user's work role by displaying visual indication 1342.

FIG. 14 is a display diagram showing a web page in which the facility has highlighted in another manner two different links as being of interest to different roles of the user. It can be seen that the facility has highlighted link 1431 as pointing to a web site that is of interest to the user's parenting role by displaying the link against a background 1441 of a first color, and highlighted link 1432 as pointing to a web site that is of interest to the user's work role by displaying the link against a background 1442 of a second color.

It will be appreciated by those skilled in the art that the above-described facility may be straightforwardly adapted or extended in various ways. While the foregoing description makes reference to preferred embodiments, the scope of the invention is defined solely by the claims that follow and the elements recited therein.

We claim:

1. A method in a computing system for identifying links to web sites that are of interest to a user, comprising:
   displaying a first web page;
   displaying a web site selection control in conjunction with the first web page;
   in response to activation of the web site selection control by the user while the first web page is displayed:
      creating a new entry corresponding to the first web page in a list of web sites of interest,
      identifying a web site containing the first web page, and storing in the created entry information specifying the identified web site;
   at a time after the storing, receiving a request for a second web page;
   identifying within the second web page a link that points to the web site specified by the created entry;
   modifying the second web page to indicate that the identified link points to a web site of interest and a first indicator associated with the identified link, the first indicator corresponding to content of the web site to which the identified link points, the content of the web site being obtained from a part of the web site of interest that is distinct from the pan of the web site to which the identified link initially points;
   displaying the second web page as modified; and
   in response to a change request from the web site that corresponds to the identified link, modifying the second web page to replace the first indicator with a second indicator associated with the identified link, the second indicator representing a change in the content of the web site,
   wherein at least one of the first indicator and the second indicator is displayed indicative of information about the date on which the user has indicated the web site to be of interest.

2. The method of claim 1, wherein the web site selection control is usable by the user to indicate that a web site to which a presently-displayed web page belongs is of interest, and wherein displaying the second web page comprises modifying the display of the web site selection control to indicate that the web page belongs to a web site indicated to be of interest.

3. The method of claim 1 wherein the website selection control is one of a plurality of buttons, each button of the plurality corresponding to a different list of web sites that have been indicated by the user to be of interest, and wherein the identified web site is added to the list of web sites to which the activated control corresponds.

4. The method of claim 3 wherein each button of the plurality corresponds to a list of web sites relating to a different user interest, a different browsing mode, or a different subject matter.

5. The method of claim 4, further comprising:
   displaying in conjunction with the browser window a second website selection control for bookmarking a web page;
   receiving an indication that the user has activated the second website selection control during the display of the distinguished web page in the browser window; and
   in response to receiving the indication that the user has activated the second website selection control, adding the distinguished web page to a list of web pages that have been bookmarked, the list of web pages that have been bookmarked being distinct from the list of web sites that have been indicated by the user to be of interest.

6. The method of claim 4 wherein the browser window is displayed by a browser program, the method further comprising:
   in response to the display of the distinguished web page in the browser window, adding the distinguished web page to a list of web pages visited by the browser program, the list of web pages visited by the browser program being distinct from the list of web sites that have been indicated by the user to be of interest.

7. A computer storage medium comprising computer executable instructions whose contents cause a computing system to track web sites by:
   during the display of a distinguished web page in the browser window, receiving a user input event associated with a web site tracking command;
   in response to receiving the user input event:
      identifying a web site with which the distinguished web page is associated;
      adding the identified web site to a list of web sites that have been selected for tracking by a user;
      when a link to a web page associated with the identified web site is displayed in the browser window at a time after the adding, identifying and displaying a first indicator for the link, the first indicator being indicative of advertising content of the identified web site; and
      updating the first indicator with a second indicator in response to a change in the advertising content while the link to a web page associated with the identified web site is displayed in the browser window, the second indicator representing the change in the content of the web site,
   wherein at least one of the first indicator and the second indicator is displayed indicative of information about the date on which the user has indicated the web site to be of interest.

8. The method of claim 1, further comprising:
   determining an event to modify the second indicator.

9. The method of claim 8, wherein the event is determined when there is a change in the content targeting the user.

10. The method of claim 8, wherein the event is determined based on user interactions with respect to the second indicator.

11. The method of claim 8, further comprising:
   displaying the web page with a third indicator which has been modified from the second indicator based on the event.

12. The method of claim 11, wherein at least one of the first indicator, the second indicator, and the third indicator includes an image and text corresponding to the content.

13. The method of claim 1, further comprising:
   assigning a specific color to the identified link based on the content of the web site.

14. The method of claim 12, further comprising:
   including an image to at least one of the first indicator, the second indicator, and the third indicator, the image being obtained from the web site.

15. The method of claim 1, wherein the content of the web site is a promotion offer targeting a user group with which the user is associated.

* * * * *

UNITED STATES PATENT AND TRADEMARK OFFICE
CERTIFICATE OF CORRECTION

| | |
|---|---|
| PATENT NO. | : 7,246,308 B1 |
| APPLICATION NO. | : 10/788885 |
| DATED | : July 17, 2007 |
| INVENTOR(S) | : Leblang et al. |

Page 1 of 1

It is certified that error appears in the above-identified patent and that said Letters Patent is hereby corrected as shown below:

| COLUMN | LINE | ERROR |
|---|---|---|
| 9 (Claim 1, | 32 line 23) | "pan" should read --part-- |

Signed and Sealed this

Eighteenth Day of December, 2007

JON W. DUDAS
*Director of the United States Patent and Trademark Office*